United States Patent
Korah et al.

(10) Patent No.: US 7,542,552 B2
(45) Date of Patent: Jun. 2, 2009

(54) METHOD AND APPARATUS FOR GENERATING DEFAULT PERSONAL GREETINGS USING TEXT TO SPEECH CONVERSION

(75) Inventors: Sarah Korah, San Jose, CA (US); Nisha N. Shah, San Jose, CA (US); Radha J. Iyer, San Jose, CA (US); John Vuong, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 674 days.

(21) Appl. No.: 11/165,932

(22) Filed: Jun. 24, 2005

(65) Prior Publication Data

US 2007/0003028 A1  Jan. 4, 2007

(51) Int. Cl.
*H04M 1/64* (2006.01)
(52) U.S. Cl. ............... 379/76; 379/88.14; 379/88.19; 379/142.01; 379/201.01; 379/88.23; 704/275
(58) Field of Classification Search ............. 379/88.14, 379/142.04, 201.01, 374.02, 76, 88.19, 88.23, 379/142.01; 704/275
See application file for complete search history.

(56) References Cited

U.S. PATENT DOCUMENTS

| 5,555,291 | A | 9/1996 | Innis et al. |
| 5,832,062 | A | 11/1998 | Drake et al. |
| 6,058,415 | A | 5/2000 | Polcyn et al. |
| 6,985,561 | B2 * | 1/2006 | Gilbert et al. ............ 379/76 |
| 7,127,403 | B1 * | 10/2006 | Saylor et al. ............ 704/275 |
| 7,349,532 | B2 * | 3/2008 | Henderson .......... 379/142.04 |
| 2006/0029209 | A1 * | 2/2006 | Moton et al. .......... 379/374.02 |
| 2006/0251232 | A1 * | 11/2006 | Wuthnow et al. ...... 379/201.01 |

FOREIGN PATENT DOCUMENTS

EP  0 608 654 A  3/1994

OTHER PUBLICATIONS

PCT ISR Oct. 13, 2006.

* cited by examiner

*Primary Examiner*—Gerald Gauthier

(57) ABSTRACT

A telecommunications system includes a user database storing user information; a text-to-speech generator; and a default user greeting generator for a messaging system for generating a greeting based on a text-to-speech conversion of user information using said text-to-speech generator. The system may further include a presence service adapted to monitor a user context, wherein the default greeting generator can generate a context sensitive user greeting based on said user context.

16 Claims, 4 Drawing Sheets

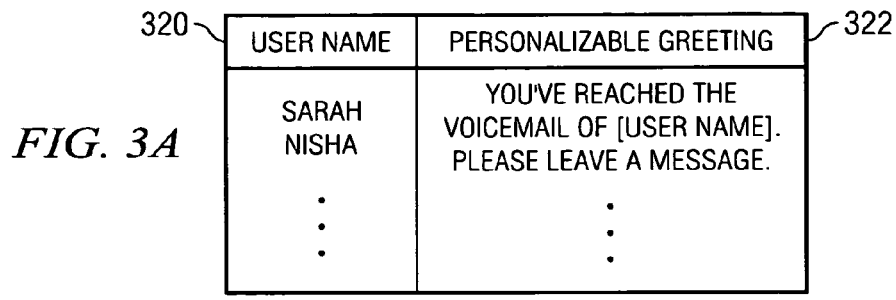
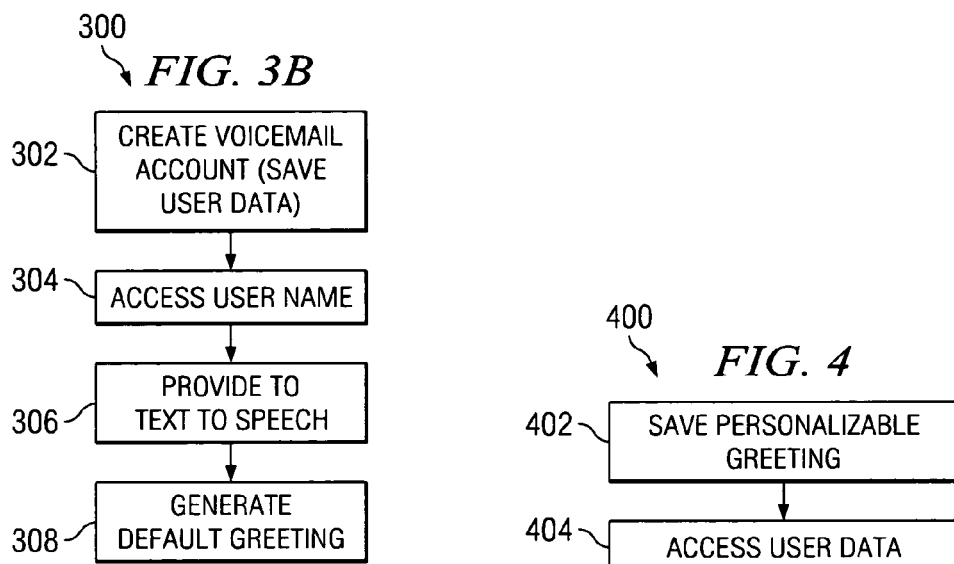
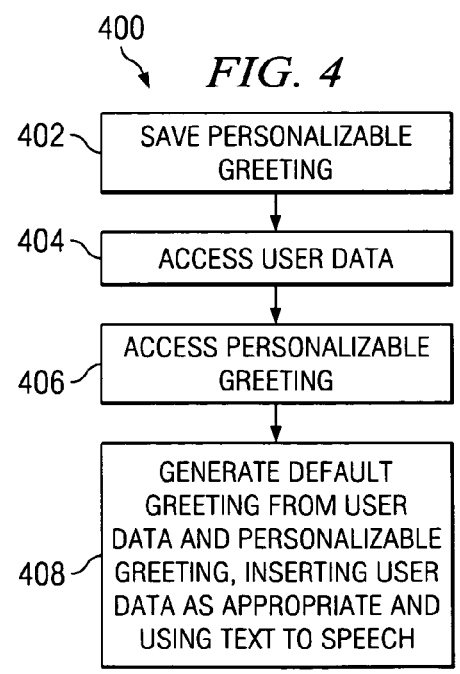
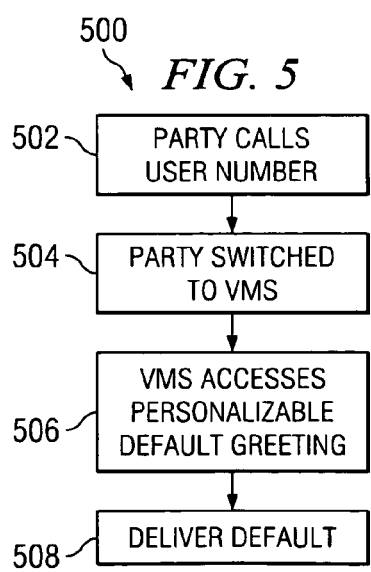

| 602 | 604 | 606 |
|---|---|---|
| USER CONTEXT | USER NAME | PERSONALIZABLE GREETING |
| IN MEETING OUT OF OFFICE ON VACATION ⋮ | SARAH NISHA ⋮ | (USER NAME) IS (USER CONTEXT). PLEASE LEAVE A MESSAGE. YOU'VE REACHED THE VOICEMAIL OF (USER NAME). PLEASE LEAVE A MESSAGE. ⋮ |

FIG. 6
600

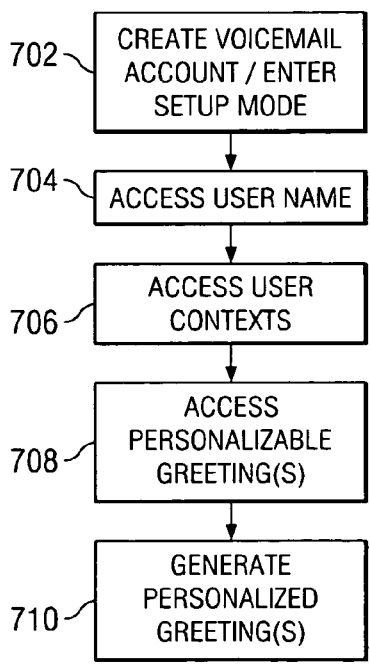

FIG. 7
700
702 — CREATE VOICEMAIL ACCOUNT / ENTER SETUP MODE
704 — ACCESS USER NAME
706 — ACCESS USER CONTEXTS
708 — ACCESS PERSONALIZABLE GREETING(S)
710 — GENERATE PERSONALIZED GREETING(S)

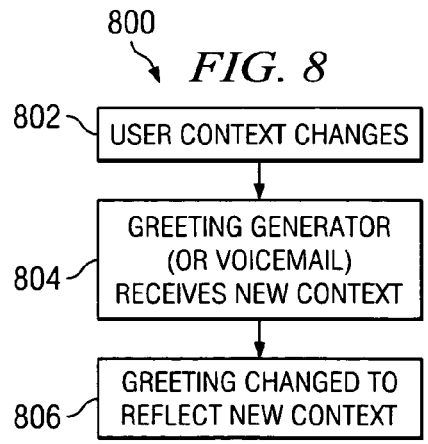

FIG. 8
800
802 — USER CONTEXT CHANGES
804 — GREETING GENERATOR (OR VOICEMAIL) RECEIVES NEW CONTEXT
806 — GREETING CHANGED TO REFLECT NEW CONTEXT

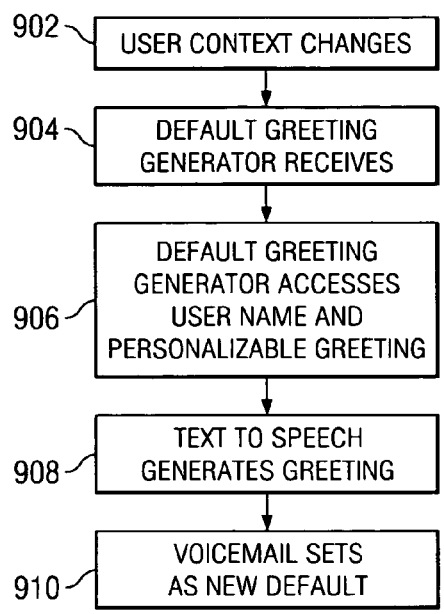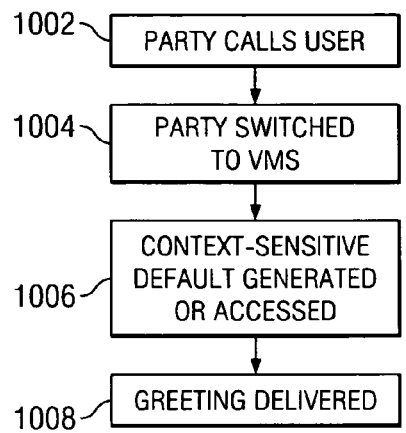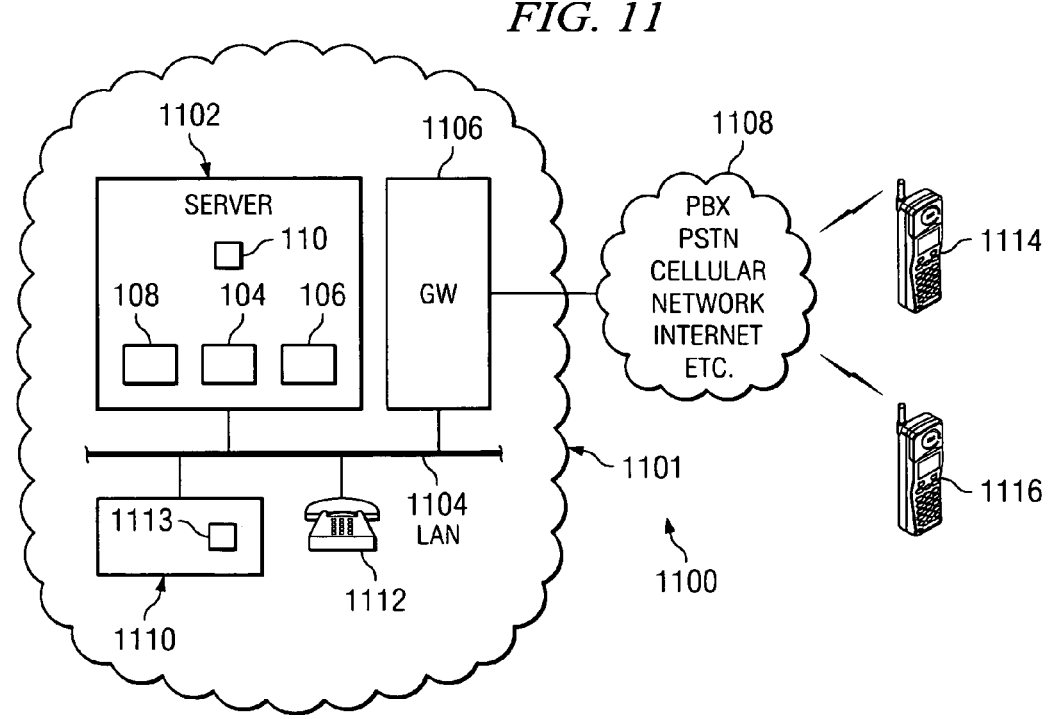

METHOD AND APPARATUS FOR GENERATING DEFAULT PERSONAL GREETINGS USING TEXT TO SPEECH CONVERSION

BACKGROUND OF THE INVENTION

1. Field of the Invention

The present invention relate to telecommunications systems and, in particular, to an improved voice response system.

2. Description of the Related Art

Modern voicemail systems allow users to define default voicemail greetings. Typically, this involves the user composing a message and then speaking it into a microphone for recording. When a caller calls in and the user is not present, the system answers with the recorded greeting. While providing a caller with feedback on whether he has reached the correct voicemail, this requires the user record their own personalized greeting using possibly unfamiliar controls. Often, the user does not wish to bother.

If a user does not compose his own personalized voicemail greeting, a default voicemail greeting may be provided. Such messages are typically rather generic and impersonal. For example, a default greeting may be on the order of "Sorry, this person is not available. Please leave a message." While this requires no effort on the part of the user, the caller is given no feedback on whether he has reached the correct mailbox. Often, the caller will simply hang up. As can be appreciated, this defeats the purpose of having a mailbox.

SUMMARY OF THE INVENTION

These and other drawbacks in the prior art are overcome in large part by a system and method according to embodiments of the present invention.

A telecommunications system according to an embodiment of the present invention includes a voicemail system; and a default greeting generator configured to automatically generate a default personalized greeting for users of said voicemail system. In certain embodiments, the default greeting generator is configured to use a text-to-speech conversion of user data to generate said default personalized greeting. In certain embodiments, the default greeting generator is configured to receive context information and generate a context sensitive personalized greeting using a text-to-speech conversion and said user context information.

A telecommunications system according to an embodiment of the present invention includes a user database storing user information; a text-to-speech generator; and a default user greeting generator for a messaging system for generating a greeting based on a text-to-speech conversion of user information using said text-to-speech generator. The system may further include a presence service adapted to monitor a user context, wherein the default greeting generator can generate a context sensitive user greeting based on said user context.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3A is a diagram illustrating an exemplary default user greeting according to an embodiment of the present invention.

FIG. 3B is a flowchart illustrating operation of an embodiment of the present invention.

FIG. 4 is a flowchart illustrating operation of an embodiment of the present invention.

FIG. 5 is a flowchart illustrating operation of an embodiment of the present invention.

FIG. 6 illustrates exemplary defualt greetings according to embodiments of the present invention.

FIG. 7 is a flowchart illustrating operation of an embodiment of the present invention.

FIG. 8 is a flowchart illustrating operation of an embodiment of the present invention.

FIG. 9 is a flowchart illustrating operation of an embodiment of the present invention.

FIG. 10 is a flowchart illustrating operation of an embodiment of the present invention.

FIG. 11 is a diagram schematically illustrating a system according to an embodiment of the present invention.

DETAILED DESCRIPTION OF EMBODIMENTS OF THE INVENTION

Figure 1:
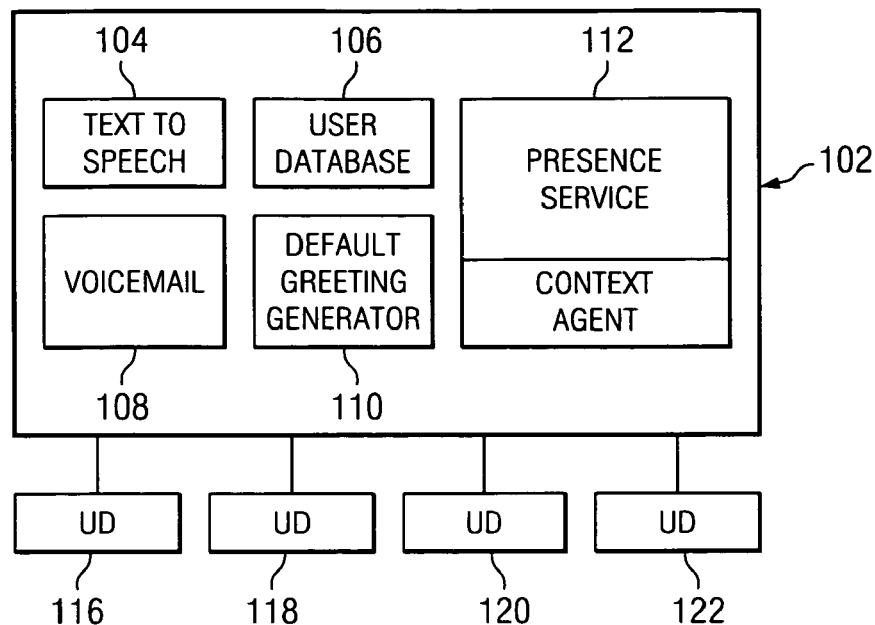
FIG. 1 is a diagram schematically illustrating a system according to embodiments of the present invention.

Turning now to the drawings and, with particular attention to FIG. 1, a diagram of a telecommunications system 100 according to an embodiment of the present invention is shown. The system includes a media service or server 102 that may include, be operably coupled to, or in communication with a text-to-speech service 104, a user database 106, an interactive voice response service such as a voicemail service 108, a default greeting generator 110, and a presence service 112. An exemplary server environment including a presence service capable of being adapted for use in a system according to embodiments of the present invention is the OpenScape system, available from Siemens Information and Communication Networks, Inc. Such an environment can be implemented, for example, in conjunction with Windows Server, Microsoft Office Live Communications Server, Microsoft Active Directory, Microsoft Exchange and SQL Server.

User devices, such as user devices 116, 118, 120, 122 may be operably coupled to or in communication with the media service 102. In some embodiments, a user device may be or include such things as telephones, cellular telephones, PDAs, computers, etc. For example, the user devices 116, 118, may be personal computers implementing the Windows XP™ operating system. In addition, the user devices 120, 122 may include telephony and other multimedia messaging capability using, for example, peripheral cameras, Webcams, microphones and speakers (not shown) or peripheral telephony handsets, such as the Optipoint™ handset available from Siemens Information and Communication Networks.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The voicemail service 108 provides voicemail mailboxes for users for storing messages when the user is unable to take the call. The voicemail service 108 provides for users to record and set voicemail greetings, and can also allow users to select default voicemail greetings. The voicemail service 108 may be implemented in hardware and/or software operating on one or more servers, computer systems, host or mainframe computers, workstations, etc. In some embodiments the voicemail service 108 may be operating on some or all of the same device(s) as other components in the system 100.

The user database 106 stores user information, such as user name, telephone numbers, presence status or context, and the like. In addition, the user database 106 may store default user greetings or personalizable greetings, as will be explained in greater detail below. The user database 106 may be implemented in hardware and/or software operating on one or more servers, computer systems, host or mainframe computers, workstations, etc. In some embodiments the user database 106 may be operating on some or all of the same device(s) as other components in the system 100.

The text-to-speech generator 104, which may be embodied as a conventional text-to-speech generator, can receive text from various sources and generate an audio file corresponding to the input text. As will be explained in greater detail below, in accordance with embodiments of the present invention, the text-to-speech generator 104 may operate in response to commands from the default greeting generator 110 to access user data and generate one or more audio files from the user data, to be used in or as a personalized default message.

The text-to-speech generator 104 may be implemented in hardware and/or software operating on one or more servers, computer systems, host or mainframe computers, workstations, etc. In some embodiments the text-to-speech generator 104 may be operating on some or all of the same device(s) as other components in the system 100.

The default greeting generator 110 functions to access user data, such as a user name, from the database 106, and provide it to the text-to-speech generator 104. Once the appropriate text is converted to an audio file, the default greeting generator 110 generates a personalized default greeting, for example, from one or more personalizable greetings stored in memory. The resulting personalized greeting is then used as the outgoing greeting.

The default greeting generator 110 may be implemented in hardware and/or software operating on one or more servers, computer systems, host or mainframe computers, workstations, etc. In some embodiments the default greeting generator 110 may be operating on some or all of the same device(s) as other components in the system 100.

The presence and availability service 112 may be or include an application that monitors the presence and availability of users and/or devices. That is, the presence and availability service 112 monitors the context of one or more devices. The presence and availability service 112 may be implemented in software operating on one or more servers, computer systems, host or mainframe computers, workstations, etc. In some embodiments the presence and availability service 112 may be operating on some or all of the same device(s) as other components in the system 100.

More particularly, in some embodiments, the presence and availability service 112 may include a context agent and provide context information to one or more applications, such as the default greeting generator 110 upon request, periodically, or in accordance with some other plan or procedure. In some embodiments, exemplary contexts could be a state of "in meeting," "on vacation," "in the office," "out of the office," "roaming," "offline," "online," "unknown," "on business trip," "in transit," "mobile," "busy," etc. Thus, the context describes the implied availability of the user or associated device. The presence and availability service 112 may provide or include an application interface that may be able to receive, retrieve, or otherwise obtain information regarding a context and/or a device associated with the context, such as calendar information, schedule information, location information, configuration information, context information, etc. Thus, in some embodiments, different applications may be used to set, monitor or change a presence context. For example, a calendar program, telephone user interface, graphical user interface, plug-in, etc. may allow or enable a program to set or change a presence context for the user manually or automatically.

In some embodiments, the presence and availability service 112 may be or include an application that communicates with or is connected to one or more registered devices (e.g., devices), that allows devices to register with the system 100 or helps facilitate their registration, etc. For example, in a SIP environment, the devices may be registered with the system 100 and may show up or be described in registration databases as being assigned to particular identities.

Figure 2:
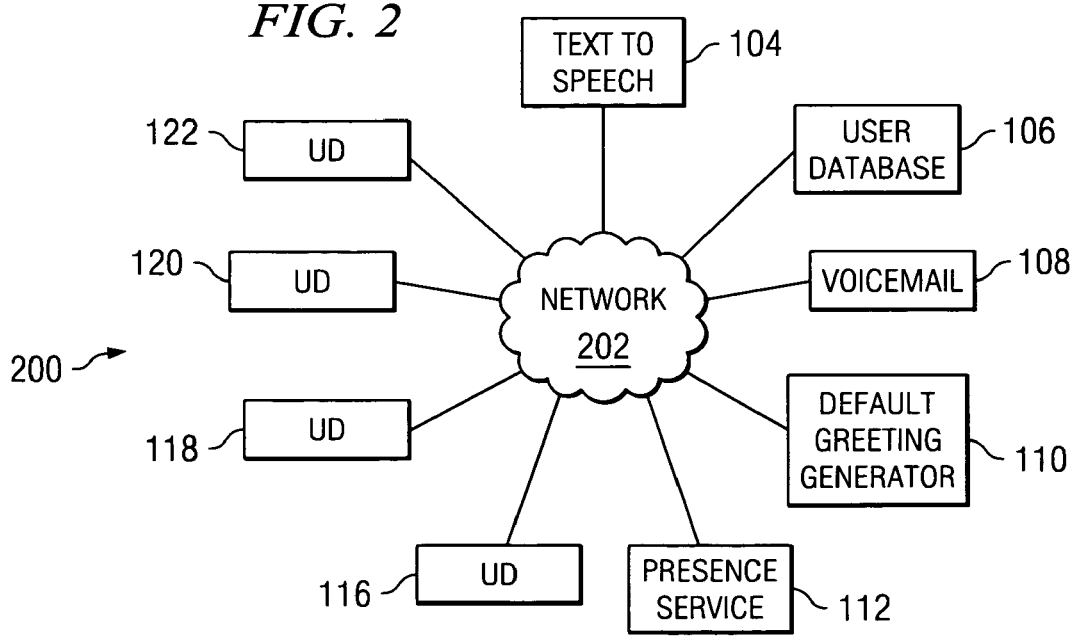
FIG. 2 is a diagram schematically illustrating a system according to embodiments of the present invention.

In certain embodiments of the present invention, one or more of the components of the system 100 may be connected to or in communication with each other via a communication network. For example, turning now to FIG. 2, a system 200 including various components of the system 100 is illustrated, wherein some or all of the components are in communication via a network 202. The network 202 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 222 may be implemented using a TCP/IP network and may implement voice or multimedia over IP using, for example, the Session Initiation Protocol (SIP).

As noted above, according to an aspect of the present invention, a default personalized voice greeting can be generated using the text-to-speech engine 104 and user data, such as a user name. In certain embodiments, the system will access the user data, such as a user name, and perform a text-to-speech conversion on it. The resulting audio file is then stored and used for the default personalized greeting, which could be as simple as recitation of the name, i.e., playing the file.

In certain embodiments, the system will store one or more personalizable greetings, and "insert" the speech converted text into the personalizable greeting to form a personalized greeting. For example, shown in FIG. 3A are exemplary user names 320 and an exemplary personalizable greeting 322, which are normally stored in the user database 106 or other memory. The personalizable greeting 322 may be of the form "You've reached the voicemail of [user name]. Please leave a message." In operation, once the user has been added to the system, the user name will be converted to speech and the personalized greeting will be generated.

For example, turning now to FIG. 3B, a flowchart 300 illustrating operation of an embodiment of the present invention is shown. The particular arrangement of elements in the flowchart 300 is not meant to imply a fixed order to the elements; embodiments can be practiced in any order that is practicable.

In a step 302, a party, such as an administrator, can set up a voicemail account for a user or the user can access a setup mode. For example, this can include storing user data such as name and phone number(s) in user database 106. In a step 304, the default greeting generator 110 may then access the new user account for the user name. In a step 306, the user name is provided to the text-to-speech engine 104, which will then convert the received user name to speech, i.e., to a speech or audio file. The speech file is then used, in a step 308, to generate a default personalized greeting for the user. In some embodiments, the speech file, representative of the user name, may constitute the entirety of the default greeting; in others, additional personalizable greetings may be provided, as will be discussed in greater detail below.

Turning now to FIG. 4, a flowchart 400 illustrating operation of an embodiment of the present invention is shown. The particular arrangement of elements in the flowchart 400 is not meant to imply a fixed order to the elements; embodiments can be practiced in any order that is practicable. FIG. 4 illustrates a particular method for generating a personalizable greeting.

In a step 402, the system can save a personalizable greeting in the user database 106. A personalizable greeting may be a generic text or speech file including one or more "fields" into which a personalized portion may be inserted, such as shown in FIG. 3A. In a step 404, the default greeting generator 110 can access user data, such as in response to creation of a new user account. In a step 406, the default greeting generator 110 will access a personalizable greeting. Finally, in a step 408, the default greeting generator 110 generates a default greeting from the user data and the personalizable greeting, inserting the user data into the field(s) and causing the text to speech service 104 to generate the appropriate audio file. Alternatively, the personalizable greeting could already be in speech form, as an audio file; the speech converted user name can be "inserted" and the result stored as a user-specific personalizable greeting.

A flowchart 500 illustrating operation of an embodiment of the present invention is shown in FIG. 5. In particular, the flowchart 500 illustrates a party calling a user with an active default greeting. The particular arrangement of elements in the flowchart 500 is not meant to imply a fixed order to the elements; embodiments can be practiced in any order that is practicable In a step 502, a party can call a user number. In a step 504, the party can be switched to the voice mail system 108, for example as when the called party is not present. In a step 506, the voicemail system 108 accesses from the user database 106 the personalized default user greeting. Finally, in a step 508, the voice mail system 108 can deliver the personalized default greeting. It is noted that, while it is contemplated that the default greeting is stored beforehand, the default greeting and personalized greeting could be generated "on the fly."

As noted above, in certain embodiments, the personalized greeting can be based on user data such as a name, as well as the presence context, as determined by the presence and availability service 112. This is illustrated generally in FIG. 6.

For example, FIG. 6 shows a plurality of user contexts 602. In the embodiment illustrated, these can include In Meeting, Out of Office, and On Vacation. Other contexts can include, for example, In Transit, Do Not Disturb, and the like. It is noted that, while a variety of user contexts are available, typically a user will have only one at a particular time. It is further noted that these are by way of example only. Also shown are a plurality of user names 604, e.g., Sarah and Nisha. Exemplary personalizable greetings are shown at 606. For example, one such greeting may be "[User name] is [user context]. Please leave a message." Another might be "You have reached the voicemail of [user name]. Please leave a message."

In operation, certain embodiments of the present invention provide a default greeting or message based on a user name (e.g., message 2 above). However, if the user presence context changes, then the default greeting can likewise be changed. Thus, the default greeting generator 110 is coupled to receive context information from the presence and availability service.

Turning now to FIG. 7, a flowchart 700 illustrating operation of an embodiment of the present invention is shown. The particular arrangement of elements in the flowchart 700 is not meant to imply a fixed order to the elements; embodiments can be practiced in any order that is practicable In a step 702, an administrator or user can create a voice mail account, or enter a set up mode associated with an existing account. In a step 704, the default greeting generator 110 can then access the user name from the user database 106. In a step 706, the default greeting generator 110 can access user contexts (e.g., stored in the user database 106) for associating them with the resulting default greeting. In a step 708, the default greeting generator 110 can access the context-sensitive personalizable greeting(s). Finally, in a step 710, the default greeting generator 110 can cause the text-to-speech engine to generate the context-sensitive default personalized greetings. These can then be stored in association with the other user data.

Turning now to FIG. 8, a flowchart 800 illustrating operation of an embodiment of the present invention is shown. The particular arrangement of elements in the flowchart 800 is not meant to imply a fixed order to the elements; embodiments can be practiced in any order that is practicable. In particular, FIG. 8 illustrates in general operation of the system when presence context is changed or updated.

In a step 802, the user context can change. For example, in certain embodiments, the user can manually change the context using, for example, a suitable interface on his user device. Alternatively, a program, such as a calendar program, can automatically update the user's presence context. As noted above, the user context could reflect such states as, for example, "In Meeting," "Out of Office," and the like. In a step 804, the voice mail system (or, depending on the implementation, the default greeting generator) receives the context from the presence and availability service 112. Finally, in a step 806, the stored context sensitive personalized greeting is accessed and set as the new voicemail greeting.

Turning now to FIG. 9, a flowchart 900 illustrating operation of an embodiment of the present invention is shown. The particular arrangement of elements in the flowchart 900 is not meant to imply a fixed order to the elements; embodiments can be practiced in any order that is practicable. In particular, FIG. 9 illustrates in general operation of the system according to a particular embodiment when presence context is changed or updated.

In a step 902, the user context changes. As discussed above, this may typically be accomplished manually or through automatic setting by an application program. In a step 904, the default greeting generator 110 receives or detects the change and the new context. In a step 906, the default greeting generator 110 accesses the user name and personalizable greeting associated with the context. In a step 908, the default greeting generator 110 causes the text to speech engine to generate the new default greeting based on the user name, context, and personalizable greeting. Finally, in a step 910, the resulting personalized greeting is saved and set as the voicemail greeting.

Turning now to FIG. 10, a flowchart 1000 illustrating operation of an embodiment of the present invention is shown. The particular arrangement of elements in the flowchart 1000 is not meant to imply a fixed order to the elements; embodiments can be practiced in any order that is practicable.

In a step 1002, a third party caller can call the user. In a step 1004, the caller is switched to the voice mail system 108. In a step 1006, the context-sensitive default greeting can be generated or accessed. If generated on-the-fly, the default greeting generator 110 and text to speech service 104 will operate in conjunction with the presence and availability service 112 in a manner similar to that discussed above. Finally, in a step 1008, the greeting is delivered.

An exemplary network architecture that may be suitable for use with embodiments of the present invention is shown in FIG. 11. As shown, the system 1100 includes an enterprise network 1101 and a public network 1108. The enterprise network 1101 may include a wired or wireless local area network (LAN) 1104. A server 1102 that may be embodied as a multimedia server implementing a text-to-speech service 104, a user database 106, a voicemail service 108, a default greeting generator 110, and a presence and availability service 112 may be coupled to the LAN 1104. An exemplary presence service is part of the Siemens Openscape presence aggregation middleware, available from Siemens Corporation.

Also coupled, connected to or in communication with the LAN 1104 may be one or more user devices 1110, 1112. The user devices 1110, 1112 may be implemented as personal computers 1110 or digital telephones 1112, such as Internet Protocol (IP) based digital telephones.

An exemplary personal computer 1110 may also include a web portal 1114, which can be used to set the user's presence state and/or receive the presence states of other users across one or more user devices.

A gateway 1106 may also be coupled to the LAN 1104. The gateway 1106 provides an interface to the public network 1108, which may be implemented, for example, as one or more of the PSTN, cellular telephone network, Internet, one or more PBX's, and the like. One or more user devices 1114, 1116, which may be implemented as one or more cellular telephones, may be in communication with the public network 1108.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents.

What is claimed is:

1. A telecommunications system, comprising:
   a plurality of communications devices, said plurality of communications devices being assignable to telecommunications system users;
   a presence service adapted to monitor said plurality of communications devices for user context;
   a user database storing user information for each assigned user;
   a text-to-speech generator;
   personalizing means for automatically personalizing a default user greeting for said each assigned communications device, the personalized default greeting including text-to-speech converted said user information;
   storage storing each personalized default greeting until a replacement is provided; and
   greeting means for selectively providing a stored default greeting responsive to communications directed to a respective communications device, wherein said personalizing means includes means for generating a context sensitive user greeting based on said user context, said greeting means further selectively providing a respective context sensitive user greeting.

2. A telecommunications system, comprising:
   a plurality of communications devices, each of said plurality of communications devices being assignable to a user;
   a voicemail system providing voicemail to said plurality of communications devices; and
   a presence service monitoring said plurality of communications devices for user context;
   a default greeting generator configured to automatically personalize a default voicemail greeting for each communications device responsive to said each communications device being assigned to a user; and
   storage storing each personalized user default greeting until a replacement is provided;
   said default greeting generator further selectively providing a respective context sensitive user greeting.

3. A telecommunications system in accordance with claim 2, said default greeting generator configured to use a text-to-speech conversion of user data and insert converted user data into a personalizable greeting to generate said default voicemail greeting for a respective communications device.

4. A telecommunications system in accordance with claim 3, said default greeting generator configured to receive context information and generate an audio file with context sensitive information using a text-to-speech conversion and insert said audio file in said default voicemail greeting.

5. A telecommunications system in accordance with claim 4, wherein said context information is automatically set.

6. A telecommunications system in accordance with claim 4, wherein said context information is manually set.

7. A method, comprising:
 accessing a database;
 placing user data in said database, said user data being for a user associated with a device operably coupled an interactive voice response system, said device being one of a plurality of communications devices monitored for user context; and automatically responsive to placing said user data
 performing a text-to-speech conversion on said user data; and
 personalizing a greeting for said interactive voice response system with converted said user data, said greeting further being selectively personalized with a respective user context.

8. A method in accordance with claim 7, wherein said interactive voice response system is a voicemail system.

9. A method in accordance with claim 7, wherein said user data comprises a user identification.

10. A method in accordance with claim 7, wherein said user data comprises user context information.

11. A voice response system, comprising:
 a greeting generator; and
 a user database configured to store user information for any communications device operably coupled to said voice response system, each coupled communications device being identifiable in said user database with a single user, said coupled communications device being one of a plurality of communications devices monitored for user context;
 wherein the greeting generator is configured to automatically convert to speech selected user information stored as text in said user database and insert an audio file with converted said user information into a greeting for a communications device for a respective identified user, said greeting generator further selectively providing a respective context sensitive user greeting.

12. A voice response system in accordance with claim 11, further including a presence service configured to monitor a user presence and store one or more presence contexts in the user database, the greeting generator being further configured to convert the one or more presence contexts to speech, converted presence contexts being included in said greeting.

13. A voice response system in accordance with claim 11, further including a messaging system, wherein the greeting is provided as an outgoing greeting to callers to the communications device.

14. A telecommunication system, comprising:
 a network;
 a plurality of user devices operably coupled to the network, said plurality of user devices each being assignable to a user;
 a voice response system operably coupled to the network, the voice response system including a greeting generator and a user database configured to store user information for each assigned user;
 a presence service adapted to monitor said plurality of communications devices for user context; and
 wherein the greeting generator is configured to automatically generate a user greeting deliverable to said plurality of user devices, said user greeting being personalized based on and including a text-to-speech conversion of user information, said greeting generator further selectively providing a respective context sensitive user greeting.

15. A telecommunications system in accordance with claim 14, wherein said presence service is configured to monitor user presence of one or more assigned users and store one or more presence contexts in the user database, each respective context sensitive user greeting being personalized based on a text-to-speech conversion of the one or more presence contexts.

16. A telecommunications system in accordance with claim 15, further including a messaging system, wherein the user greeting is an outgoing greeting for the messaging system.

* * * * *